Jan. 7, 1947.  O. J. MINUTO  2,413,841
GAUGE FOR TESTING TAPERS
Filed June 24, 1944  3 Sheets-Sheet 3

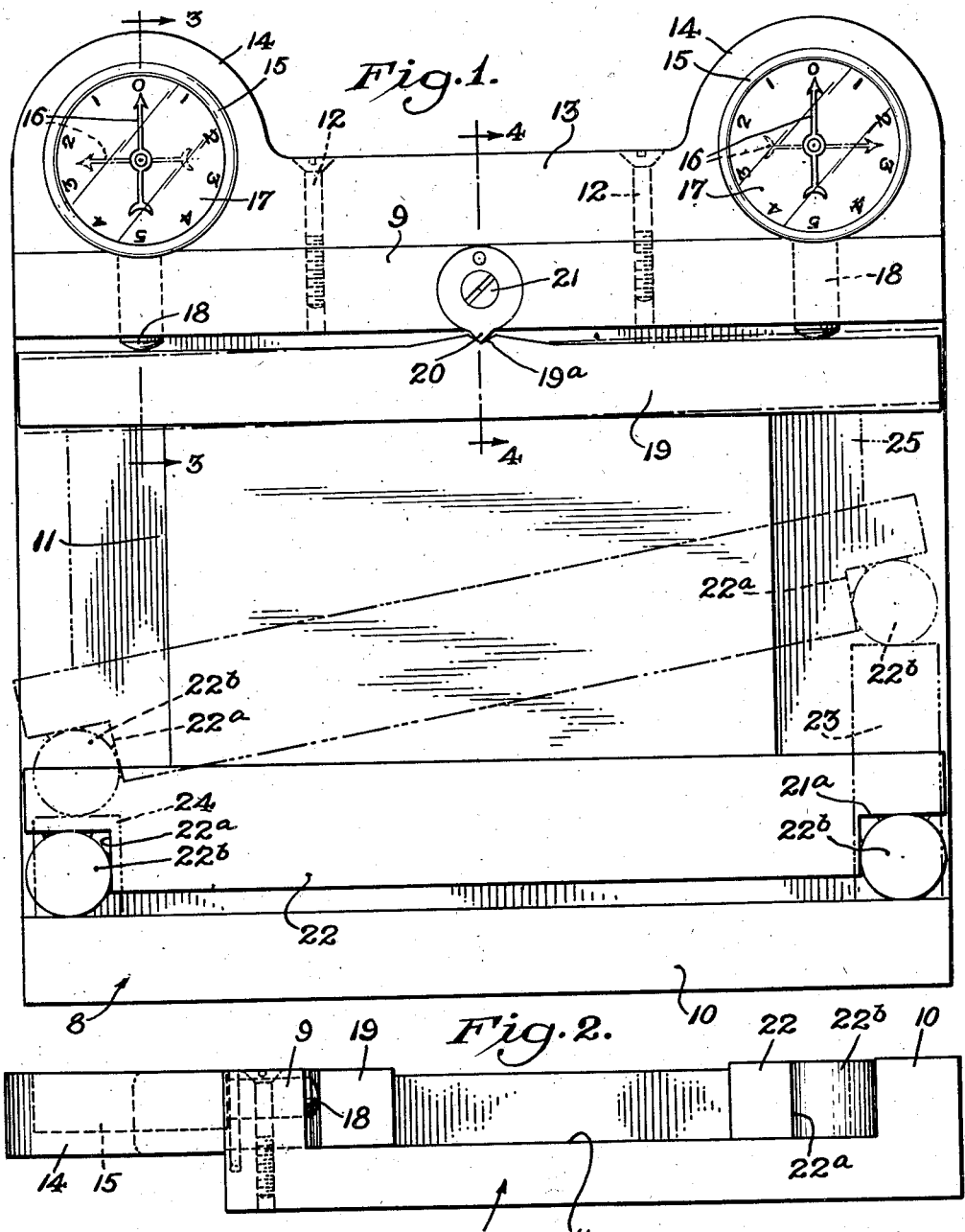

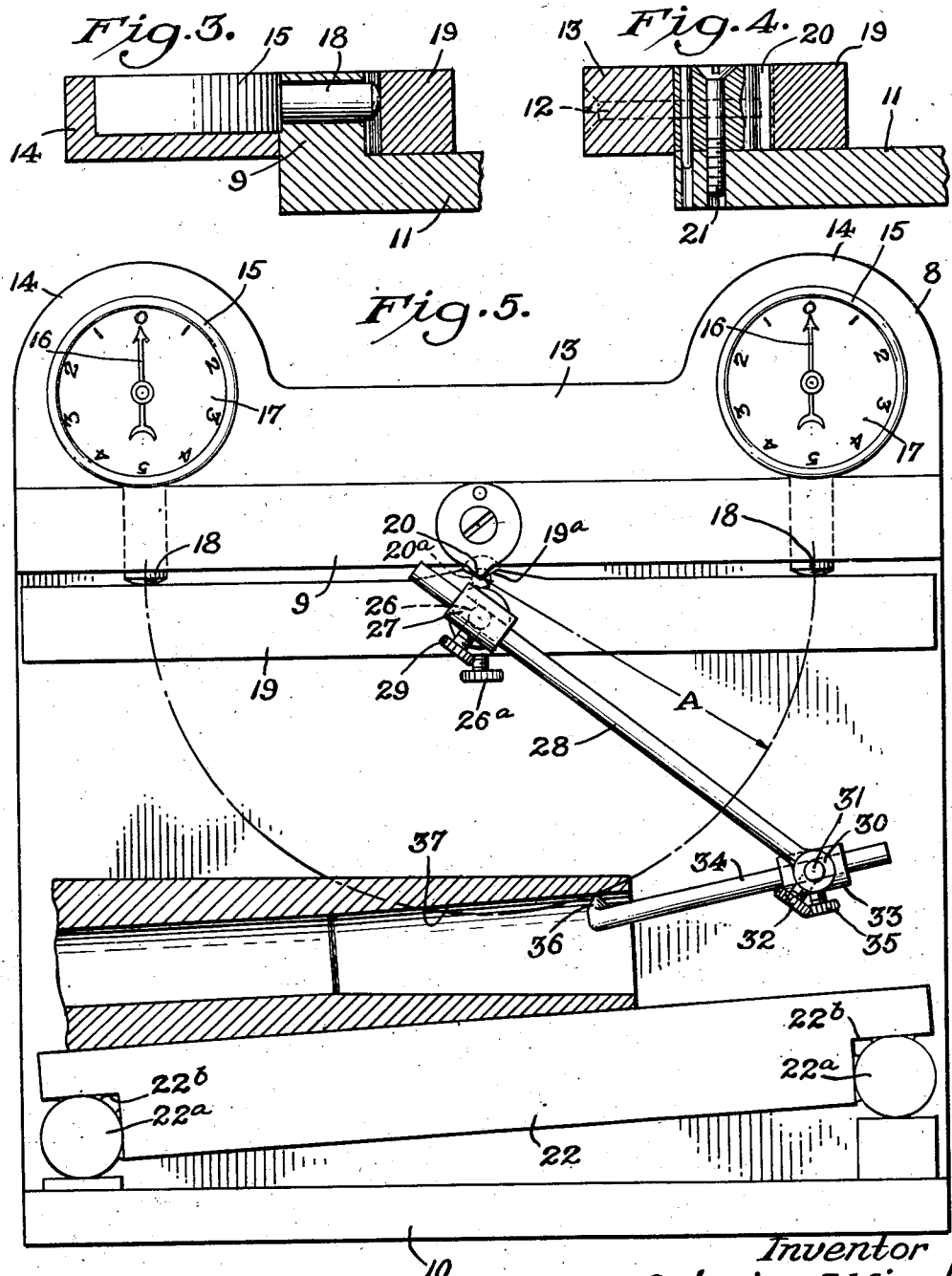

Inventor
Octavius J. Minuto
BY
Edward W. Weinut
Attorney.

Patented Jan. 7, 1947

2,413,841

UNITED STATES PATENT OFFICE 2,413,841

GAUGE FOR TESTING TAPERS

Octavius J. Minuto, Hamilton, Ohio

Application June 24, 1944, Serial No. 541,865

12 Claims. (Cl. 33—174)

This invention relates to a gauge which is adapted for testing the taper on articles, tools or devices and concerns itself with a structure or frame that carries one or more dial indicators, each indicator having a plunger; a pivoted rock bar mounted in the frame normally engages the plungers and this rock bar is adapted to be engaged by the article that is being tested for operating the plungers and the indicators for indicating whatever error, if any exist. For more general use, the gauge may embody an adjustable sine bar in opposed relation to the rock bar.

The gauge is primarily designed for testing external tapers, but it is also shown provided with an attachment for testing internal tapers. In testing an article, the same can be moved backwards and forwards and rotated and marked for the correction of error if this can be done by reducing parts. Thus the exact spot for correction can be readily ascertained.

It is characteristic of this invention that it produces a simple, quick and absolutely accurate method in testing gauges that attains results as close as one-ten-thousandth of an inch. It is a time saver over methods now in use.

This invention comprises the novel structure and combination of parts hereinafter described and more particularly pointed out and defined in the appended claims.

In the accompanying drawings which illustrate a preferred form of this invention and in which similar reference numerals refer to similar features in the different views:

Fig. 1 is a top plan view of a taper gauge involving this invention.

Fig. 2 is an end elevational view of the same.

Fig. 3 is a sectional view taken upon the line 3—3 of Fig. 1 looking in the direction of the arrows.

Fig. 4 is a sectional view taken upon the line 4—4 of Fig. 1 looking in the direction of the arrows.

Fig. 5 is a top plan view of the gauge shown in Fig. 1 with an attachment for testing internal tapers.

Figure 6:
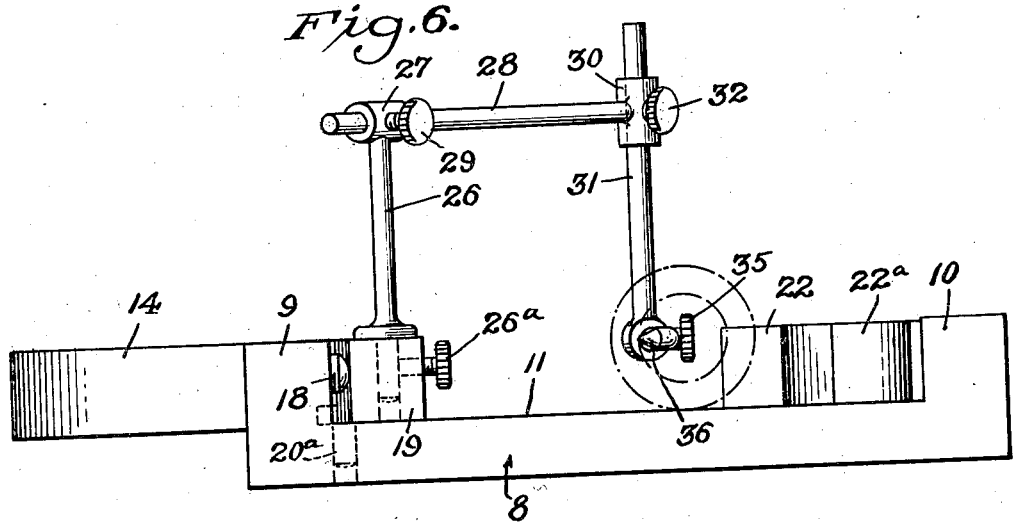
Fig. 6 is a left side elevational view of Fig. 5.

In referring now to the drawings which illustrate a preferred form of the invention, there is shown a frame 8 having vertical walls 9 and 10 in opposed spaced relation with a horizontal floor 11 between the walls. The wall member 9 is preferably made separate from the frame for assembly purposes; it is shown as attached by screws 12 to a flange 13 on one side of the frame, although it may be made integral with such flange. The flange 13 has enlarged arcuate terminal portions 14 which form circular dial chambers 15 in which pointers 16 are mounted and that are adapted to rotate with respect to graduated dial faces 17. Each pointer is operatively connected with a plunger 18 in a manner well known in the art that requires no description. The plungers 18 slidably extend thru apertures in the wall member 9 and slightly therebeyond for engagement with a rocker bar 19.

The rocker bar 19 has a V-shaped bearing groove 19a in which a knife edge bearing 20 is seated. The knife edge bearing is attached by a screw 21 at the medial portion of the wall member 9. Due to this construction, the rocker bar 19 can rock or tilt about the knife edge bearing and operate the dial plungers 18 for rotating the pointers. In the present instance, the gauge is shown as provided with two dial indicators for the purpose of providing a double check, although one dial indicator may be omitted if desired.

For providing a gauge of more general use, a loose and movable block or sine bar 22 is adjustably supported against the wall 10. This bar has cut out end portions 22a in which cylindrical bearings 22b are secured for maintaining proper bearing relations with gauge blocks 23 and 24 when the sine bar is adjusted to an oblique position as shown in dotted lines. The gauge blocks 23 and 24 may be of any standard or well known design.

The confronting faces of the rocker bar 19 and the block or sine bar 22 are accurately machined to receive therebetween the tapered article 25 (shown in dotted lines in Fig. 1) to be tested as to external diameter. In testing the taper of an article, the same may be moved forwards and backwards and rotated to thoroughly test the taper; any variation in the taper will be shown on a dial or dials thru the movement of the rock bar 19 which causes operation of the dials. Variations can be marked upon the article for correction if this is possible or the article can be condemned and discarded if the taper cannot be corrected. Thus with the gauge properly set, it is a quick and easy matter to test tapers and little effort is required.

Figure 7:
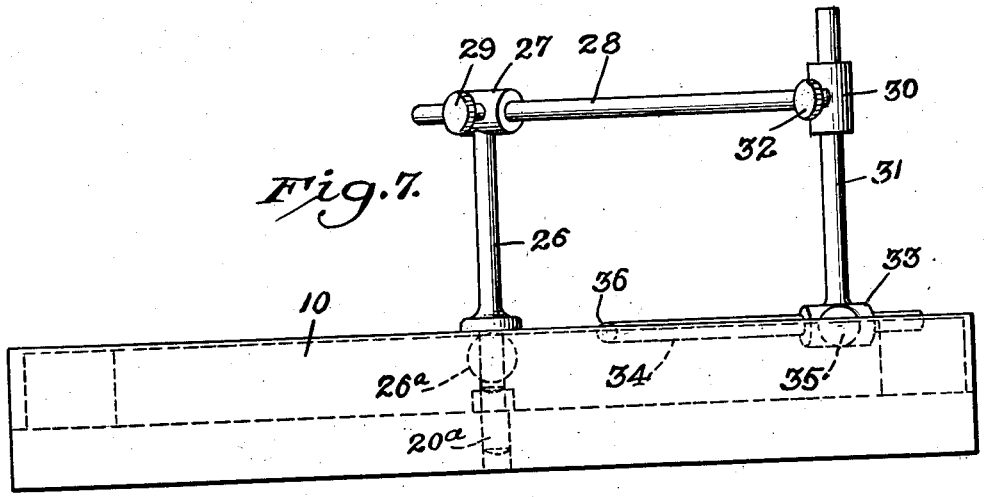
Fig. 7 is a right hand elevational view of Fig. 6.

In Figs. 5, 6 and 7 there is shown an attachment applied to the gauge for testing internal tapers. This attachment is in the form of an angular support and comprises a vertical rod 26 which may be secured at any suitable point to the rock bar 19 by a set screw 26a; in the present instance, it is shown attached to the medial point of the rock bar; a hollow cross head 27 is secured to the outer end of the rod 26 and an oblique rod 28 is adjustably secured to the cross head by a set screw 29. This oblique rod carries a T-head 30 at its outer end in which a downwardly directed bar 31 is adjustably secured by a set screw 32. The rod 31 carries a T-head 33 at its lower end in which a feeler or test bar 34 is adjustably secured by a set screw 35 in lengthwise relation with the frame. The test bar 34 may be provided with a suitable feeler point or projection 36 for contacting relation with the internal taper of an article as shown in Fig. 5 where the feeler bar is shown as extending into the tapered bore of the article to be tested. This article may be a tube 37 as shown, or any other device.

While the angular support on the rocker bar may be variously formed and attached at any suitable point, it is preferably designed so that the contact point 36 lies in the arc struck from the pivot of the rock bar and passing thru the contacting points of the plungers of the indicators. This arc will have a radius A equal to the distance from the pivot of the rock bar to an indicator plunger. The contact point 36 should however be placed above the lowermost point of the arc. However any other suitable arrangement may be provided and the indicators accordingly adjusted. Where the gauge is equipped with the attachment, it may be desirable to use a holding pivot in the rock bar such as the pivot 20a shown in Fig. 5.

In testing an internal taper, the article to be tested can be moved forwardly and rearwardly and rotated. Any inaccuracy in the taper will be transmitted thru the angular support and rock bar to the indicators which will record the errors.

It is characteristic of this invention that a simple operation is merely required to set the gauge for testing any suitable tapered article. It is hence an easy matter to test tapers very quickly after the gauge has once been set.

It will be appreciated that the gauge is exceedingly simple and involves a quick and speedy method that will save much time and effort in testing tapers.

I am aware that many changes may be made and various details of construction varied without departing from the principles of this invention, so I do not propose limiting the patent granted thereon otherwise than necessitated by the appended claims.

I claim as my invention:

1. In a gauge for testing tapers, a frame having a horizontal floor portion and a pair of opposed vertical walls, spaced dial indicators mounted in said frame beyond one wall, slidable plungers extending from said indicators thru said last mentioned wall, a rockable bar having a pivotal relation at its medial portion with said last mentioned wall and adapted for engaging said plungers, and an obliquely adjustable sine bar supported against the other wall.

2. In a gauge for testing tapers, a frame having a pair of spaced dial indicators, a plunger connected to each dial indicator, a rockable bar pivotally mounted at its medial portion in said frame and engaging said plungers, a sine bar in spaced relation to said rockable bar and means for varying the relation between said bars.

3. In a gauge for testing tapers, a frame having a horizontal floor portion and a pair of opposed vertical flanges, spaced indicators in said frame beyond one flange, slidable plungers extending from said indicators thru said last mentioned flange, a rockable bar having a pivotal connection at its medial portion with said last mentioned flange and an adjustable sine bar supported against the other flange.

4. In a gauge for testing tapers, a frame having a horizontal floor portion and opposed vertical walls, a pair of indicating devices in said frame beyond one wall, plungers extending from said indicating devices thru said last mentioned wall, a rock bar pivoted to said frame and adapted for engaging said plungers, an angular support secured to said rock bar, a feeler rod carried by said support and a sine bar supported against the other wall.

5. In a gauge for testing tapers, a frame having a pair of indicating devices, a plunger extending from each indicating device, a rock bar pivoted to said frame between the plungers and adapted for operating the same, an angular support carried by said rock bar, a feeler bar carried by said support and a sine bar in said frame beyond said support and feeler bar.

6. In a gauge for testing tapers, a frame having a pair of indicating devices, a plunger extending from each indicating device, a rock bar pivoted to said frame between said indicating devices and adapted for operating the same thru said plungers, a sine bar supported in said frame in opposed relation to said rock bar and means for causing a pivotal movement of said rock bar during a testing operation.

7. In a gauge for testing tapers, a frame having a floor portion and a vertical wall, an indicator mounted in said frame beyond said wall and having a plunger slidingly extending thru said wall, a rock bar having a knife edge bearing against said wall in engagement with said plunger and an adjustable sine bar for supporting an article to be tested against said rock bar.

8. In a gauge for testing tapers, a frame having a horizontal floor portion and a vertical wall, an indicator mounted in said frame beyond said wall and having a plunger slidably extending thru said wall, a rock bar having pivotal engagement with said wall and engaging said plunger, an angular support on said rock bar, a testing bar carried by said support and means for supporting an article to be tested against said testing bar.

9. In a gauge for testing tapers, a frame having a floor and opposed vertical walls rising in spaced relation from said floor, one wall having an enlargement provided with a circular recess, an indicator mounted in said recess and having a plunger slidably extending through said wall toward the other wall, said first mentioned wall having a knife edge bearing intermediate the ends thereof, a rockable bar pivotally mounted against said knife edge bearing and engaging said plunger, a sine bar in opposed relation to said rock bar and means for adjustably supporting said sine bar at various angles, against the other wall.

10. In a gauge for testing tapers, a frame having a floor portion and a vertical flange, a wall member attached to the inner surface of said flange, said flange having an enlargement provided with a circular recess, an indicator mounted in said recess and having a plunger slidably extending through said wall member, said wall member having a knife edge bearing intermediate its ends, a rockable bar pivotally mounted against said knife edge bearing and engaging said plunger for the purpose set forth.

11. In a gauge for testing tapers, a frame having a base and a vertical wall, said frame having a circular recess beyond said wall, an indicator mounted in said recess and having a plunger slidably extending through said wall, and a rock bar having a knife edge bearing intermediate its ends with said wall and adapted for tilting movements for operating said plunger.

12. In a gauge for testing tapers, a frame having a base and a vertical wall, said frame having a vertical recess beyond said wall, an indicator mounted in said recess and having a plunger slidably extending through said wall, a rock bar, a sensitive bearing between an intermediate point of said rock bar and said wall, a sine bar in opposed relation to said rock bar and means for adjustably supporting said sine bar.

OCTAVIUS J. MINUTO.